US009509000B2

(12) United States Patent
Grange et al.

(10) Patent No.: US 9,509,000 B2
(45) Date of Patent: Nov. 29, 2016

(54) FAN AND PCB MOUNTING IN FUEL CELL STACK ASSEMBLIES

(71) Applicant: INTELLIGENT ENERGY LIMITED, Loughborough (GB)

(72) Inventors: Nathan Grange, Loughborough (GB); Raymond Pinchin, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 322 days.

(21) Appl. No.: 14/358,835

(22) PCT Filed: Nov. 13, 2012

(86) PCT No.: PCT/GB2012/052817
§ 371 (c)(1),
(2) Date: May 16, 2014

(87) PCT Pub. No.: WO2013/072677
PCT Pub. Date: May 23, 2013

(65) Prior Publication Data
US 2015/0086810 A1 Mar. 26, 2015

(30) Foreign Application Priority Data
Nov. 17, 2011 (GB) .................................. 1119827.2

(51) Int. Cl.
*H01M 8/04* (2016.01)
*H01M 8/02* (2016.01)
*H01M 8/24* (2016.01)

(52) U.S. Cl.
CPC ..... *H01M 8/04201* (2013.01); *H01M 8/04089* (2013.01); *H01M 8/2485* (2013.01); *Y02E 60/50* (2013.01)

(58) Field of Classification Search
CPC ............ H01M 8/04; H01M 8/04201; H01M 8/04089; H01M 8/04067; H01M 8/2485
See application file for complete search history.

(56) References Cited

U.S. PATENT DOCUMENTS 5,763,113 A    6/1998   Meltser et al.
7,235,316 B2   6/2007   Acker
(Continued)

FOREIGN PATENT DOCUMENTS

CN    200962444 Y    10/2007
CN    201181440 Y    1/2009
(Continued)

OTHER PUBLICATIONS

International Search Report from International Patent Application No. PCT/GB2012/052817; mailed Mar. 19, 2013.
(Continued)

*Primary Examiner* — Kenneth Douyette
(74) *Attorney, Agent, or Firm* — Baker & Hostetler LLP

(57) ABSTRACT

A fuel cell stack assembly (30) comprises a fuel cell stack (31); an air flow plenum chamber (33) disposed on a face (4) of the stack (31) for delivering air to or receiving air from flow channels in the fuel cell stack (31), at least a part of the plenum chamber wall being defined by a printed circuit board, the printed circuit board having at least one aperture (37) therein; and a fan (36) mounted to the board adjacent the aperture (37) and configured to force air through the aperture into or out of the plenum chamber. The assembly provides integration of circuit boards essential or supportive to operation of the fuel cell assembly with the air flow plenum for forced ventilation of the fuel cells in the stack.

8 Claims, 4 Drawing Sheets

(56) References Cited

U.S. PATENT DOCUMENTS

| | | |
|---|---|---|
| 2003/0070850 A1 | 4/2003 | Reid et al. |
| 2003/0077492 A1 | 4/2003 | Kuriiwa et al. |
| 2003/0175566 A1* | 9/2003 | Fisher ................ H01M 8/04007 429/429 |
| 2004/0072046 A1* | 4/2004 | Schmidt ............ H01M 8/04089 429/410 |
| 2006/0078772 A1* | 4/2006 | Yu ..................... H01M 8/04544 429/414 |
| 2006/0228614 A1 | 10/2006 | Shu et al. |
| 2007/0099041 A1 | 5/2007 | Tung |
| 2007/0196715 A1 | 8/2007 | Shu et al. |
| 2007/0243624 A1 | 10/2007 | Speranza et al. |
| 2007/0244601 A1 | 10/2007 | Speranza |
| 2007/0264546 A1 | 11/2007 | LaVen |
| 2007/0298300 A1 | 12/2007 | Shu et al. |
| 2009/0123294 A1* | 5/2009 | Dong ....................... G01K 7/16 417/32 |
| 2009/0197132 A1 | 8/2009 | Lin et al. |
| 2010/0015039 A1 | 1/2010 | Doshi et al. |
| 2010/0028752 A1 | 2/2010 | Kattner et al. |
| 2010/0248050 A1 | 9/2010 | Hu et al. |
| 2010/0254084 A1* | 10/2010 | Chen .................. F04D 25/0633 361/695 |
| 2011/0190037 A1 | 8/2011 | Cantin et al. |
| 2011/0262740 A1* | 10/2011 | Martin, III .......... C23C 14/0647 428/332 |
| 2012/0088171 A1 | 4/2012 | Edmiston et al. |
| 2013/0084510 A1 | 4/2013 | Masui et al. |

FOREIGN PATENT DOCUMENTS

| | | |
|---|---|---|
| DE | 10 2004 001232 A1 | 8/2005 |
| DE | 202007008168 U1 | 11/2007 |
| JP | 09-022719 A | 1/1997 |
| JP | 2004-192974 A | 7/2004 |
| JP | 2006-059745 A | 3/2006 |
| JP | 2006-107789 A | 4/2006 |
| JP | 2006216326 A1 | 8/2006 |
| JP | 3134220 U | 8/2007 |
| JP | 2009-129905 A | 6/2009 |
| TW | 200836391 A | 9/2008 |

OTHER PUBLICATIONS

Search Report dated Feb. 22, 2012 from German Patent Application No. 1119827.2, International Search Report, search date Mar. 5, 2013.

* cited by examiner

FAN AND PCB MOUNTING IN FUEL CELL STACK ASSEMBLIES

CROSS-REFERENCE TO RELATED APPLICATIONS

This application is a National Stage of International Patent Application No. PCT/GB2012/052817, filed Nov. 13, 2012 and claims priority to foreign application GB 1119827.2, filed Nov. 17, 2011, the contents of which are incorporated herein by reference in their entirety.

The present invention relates particularly, though not exclusively, to open cathode fuel cells in which air is directed into the cathode channels of fluid flow plates in a fuel cell stack by means of one or more fans disposed on a side surface of the fuel cell stack.

A schematic diagram of a typical layout of an open cathode fuel cell stack is shown in FIG. 1. The fuel cell stack 1 comprises a plurality of individual cells 2 layered from left to right in the figure, to form the stack. As shown in cross-section in exploded schematic form in FIG. 2, each cell 10 comprises a membrane 11 sandwiched between porous electrodes 12, 13 and disposed between an anode flow plate 14 and a cathode flow plate 15. The membrane 11 and porous electrodes 12, 13 may together form a membrane-electrode assembly (MEA).

As is well known in the art, the anode flow plate 14 has at least one channel 16 (which may be serpentine in its form and therefore bisected many times in the cross-section) in its surface for delivering fuel to the anode side of the membrane 11 via the porous anode 12. The cathode flow plate 15 typically has many parallel channels 18 extending across its surface for delivering oxidant to the cathode side of the membrane 11 and for exhausting unused oxidant together with the reaction by-product of water and/or steam. Also as well known in the art, in many designs the anode flow plate 14 and cathode flow plate 15 are combined as a bipolar flow plate with the anode channel 16 on one face of the plate and the cathode channels 18 on the opposite face of the plate. Thus, when formed into a stack 1 of series-connected cells 2, the anode flow plate 14 of one cell is adjacent to or integrally formed back-to-back with a cathode flow plate 15 of an adjacent cell. The cathode flow plate channels 18 may be open ended at the edge of each cell and thus present an array 3 of channels 18 in a side face 4 of the fuel cell stack 1, as seen in the front face of FIG. 1. A corresponding array of channels may be present on the opposite (back) face 5 of the stack (not visible in FIG. 1) thereby providing a direct air flow path through the stack 1.

To maintain an adequate flow of oxidant through the array 3 of cathode flow channels 18 of the plates 15 in the stack, a forced air ventilation system may be provided proximal to one face of the stack, i.e. proximal to side face 4 of the stack 1. The side face 4 presents the edges of the flow plates 15 that form the array 3 of open ends of the cathode channels 18. Those open ends may be the inlet ends or the outlet ends of the channels 18.

It is an object of the invention to provide an improved construction of fuel cell stack assembly for delivery of air flow through the fuel cell stack.

According to one aspect, the present invention provides a fuel cell stack assembly comprising: a fuel cell stack; an air flow plenum chamber disposed on a face of the stack for delivering air to or receiving air from flow channels in the fuel cell stack, at least a part of the plenum chamber wall being defined by a printed circuit board, the printed circuit board having at least one aperture therein; and a fan mounted to the board adjacent the aperture and configured to force air through the aperture into or out of the plenum chamber.

A face of the printed circuit board forming an internal wall of the plenum chamber may be coated with a potting compound or other fluid tight coating. The assembly may include a frame coupled to the fuel cell stack forming side walls of the plenum chamber, the printed circuit board being attached to the frame and forming a fluid tight seal therewith. The printed circuit board may include at least one temperature sensing device mounted thereon. The printed circuit board may include at least one fan control circuit incorporated therein. The face of the stack on which the air flow plenum chamber is disposed may be a face having open channel ends therein. The printed circuit board may have a plurality of apertures therein and a corresponding plurality of fans each mounted adjacent to a corresponding aperture and configured to force air through the corresponding aperture, the fans and apertures being dispersed across the printed circuit board to provide a generally uniform pressure distribution within the plenum chamber. The printed circuit board includes at least one power control circuit incorporated therein and a heatsink disposed on a face of the printed circuit board forming an internal wall of the plenum chamber.

Embodiments of the present invention will now be described by way of example and with reference to the accompanying drawings in which.

Figure 1:
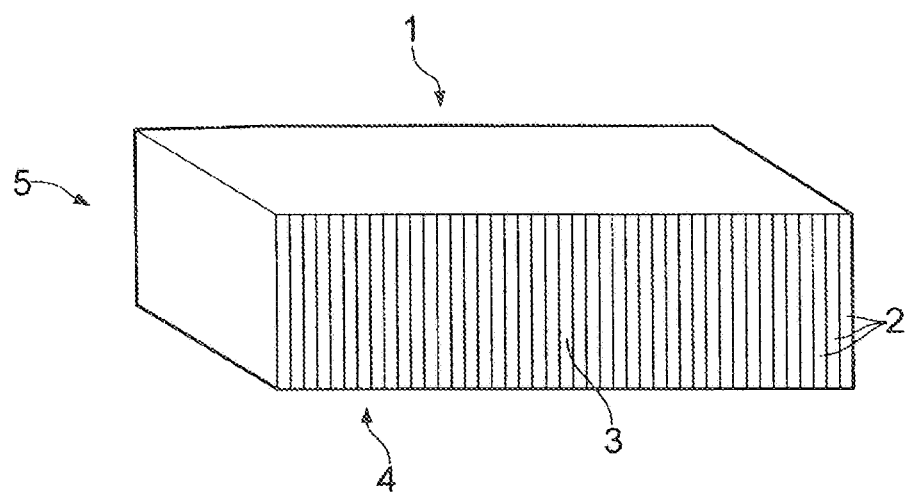
FIG. 1 is a schematic perspective view of a fuel cell stack.
Figure 2:
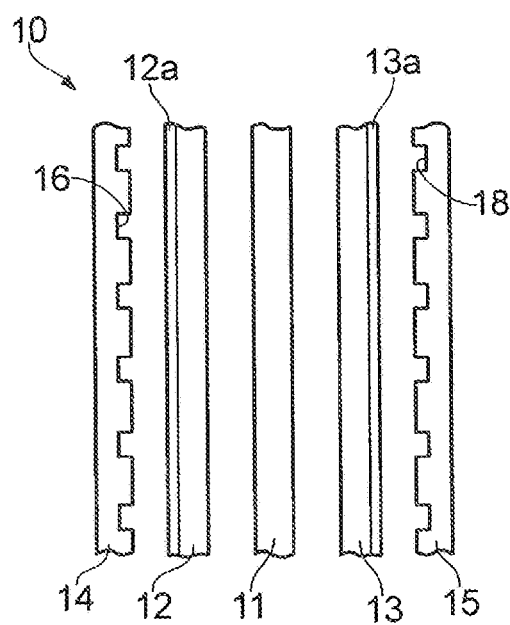
FIG. 2 is a schematic exploded cross-sectional view through a fuel cell within a fuel cell stack.

Throughout the present specification, the descriptors relating to relative orientation and position, such as "top", "bottom", "horizontal", "vertical", "left", "right", "up", "down", "front", "back", "side" as well as any adjective and adverb derivatives thereof, are used only for clarity in the sense of the orientation of a fuel cell assembly as presented in the drawings. However, such descriptors are not intended to be in any way limiting to an intended use of the fuel cell assembly which could be used in any orientation.

With further reference to FIG. 1, in order to ensure that adequate air flow for oxidation, water transport and stack cooling is forced through the cathode flow channels, it is desirable to provide a plenum housing, as will be described hereinafter, adjacent the stack face 4 that has the cathode channel inlets or outlets. The plenum housing provides a plenum chamber extending across one face of the stack and fans may be mounted onto the plenum housing, over apertures in the housing facing the cathode channel inlets or outlets. In one arrangement the fans are disposed on the downstream side of the fuel cell stack and thus the fans maintain a somewhat lower pressure in the plenum than atmospheric pressure, i.e. pulling air through the stack. The upstream side of the fuel cell stack, i.e. the stack face corresponding to the open inlet ends of the cathode channels, may be covered with a filter but otherwise exposed to ambient air. In an alternative configuration, the plenum housing may be provided on the upstream side of the fuel cell stack and thus the fans maintain a somewhat higher pressure in the plenum than atmospheric pressure, i.e. pushing air through the stack.

Figure 6:
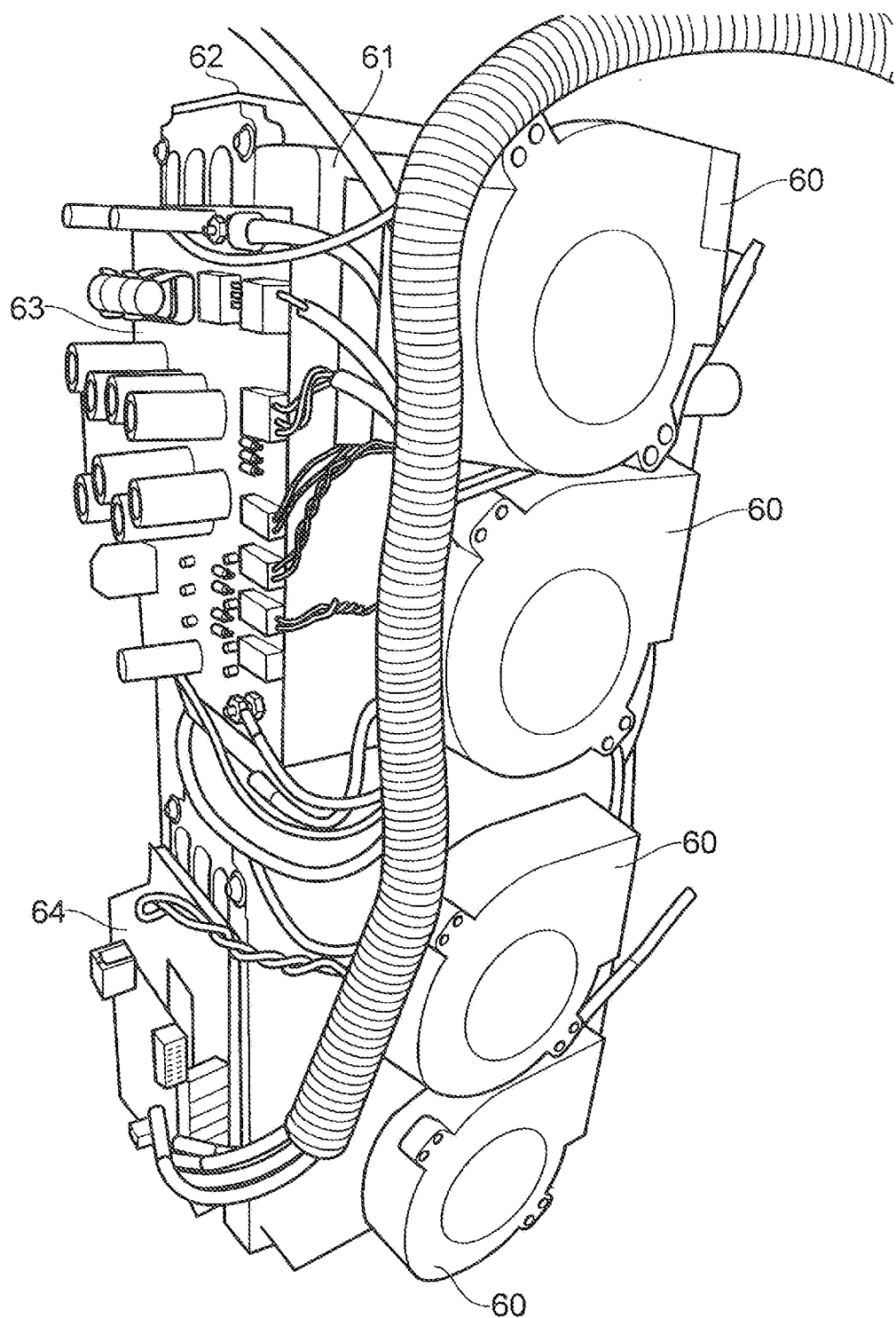
FIG. 6 is a perspective view of an alternative layout of a fuel cell stack assembly.

Fuel cell stacks require a significant number of control circuits for functions such as cell voltage monitoring, air flow control, fuel flow control, temperature monitoring, etc. These control circuits may be conveniently disposed around the fuel cell stack, e.g. mounted on the frame of the stack on faces other than the faces of the stack corresponding to the open cathode channels. Such a configuration is shown in FIG. 6 where four air flow fans 60 are disposed on such a plenum chamber 61 which is attached to a side face of the stack 62. The plenum chamber may be formed of a plastic housing. Numerous circuit boards 63, 64 are attached a different face of the fuel cell stack and cabling couples those circuit boards to other components such as the fans 60. This arrangement has a potential disadvantage in that much space around the fans 60 may be wasted and cabling must be run around the stack.

Figure 3:
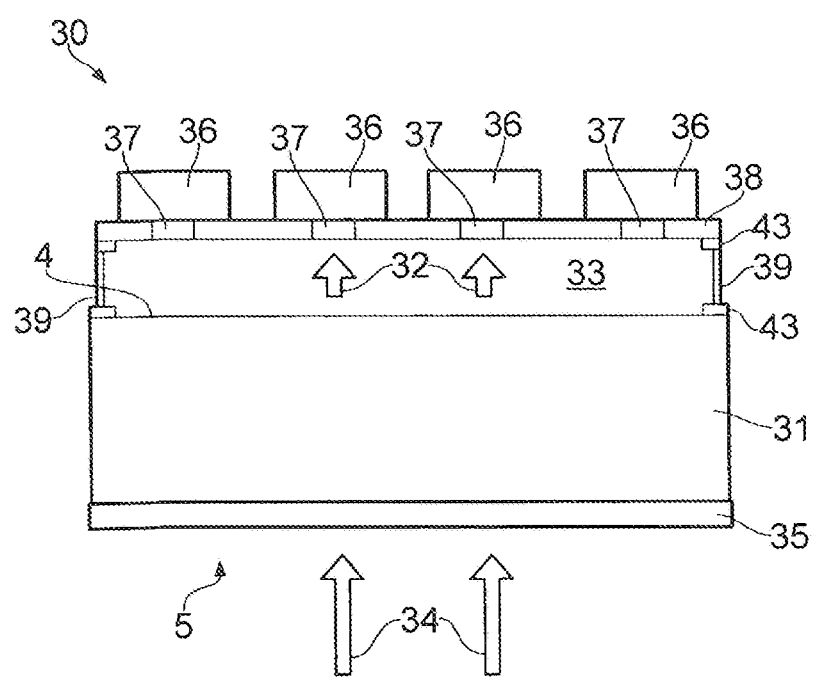
FIG. 3 is a schematic side elevation, cross-sectional view of a fuel cell stack assembly showing a fuel cell stack, plenum and fan apparatus.

With reference to FIG. 3, there is shown a cross-sectional schematic side view of a fuel cell stack assembly 30 according to a preferred aspect. A fuel cell stack 31 has a top side face 4 through which the cross-section is drawn, and this side face 4 comprises the exhaust face of the cathode flow channels from which air is drawn into a plenum chamber 33 as indicated by the air exhaust arrows 32. Air is drawn into the stack 31 at the bottom surface 5 as indicated by the air intake arrows 34. A filter unit 35 may be provided on this bottom surface 5.

On the top surface of the plenum chamber 33 is mounted a plurality of fans 36. Each of these fans communicates with the volume of the plenum chamber 33 through a respective aperture 37 in the top surface 38 of the plenum chamber housing. Each of the fans 36 may preferably be a radial fan in which air is drawn into the centre of the fan from the lower side as shown and expelled radially outwardly through a radial port. However, any suitable form of fan may be used.

Figure 4:
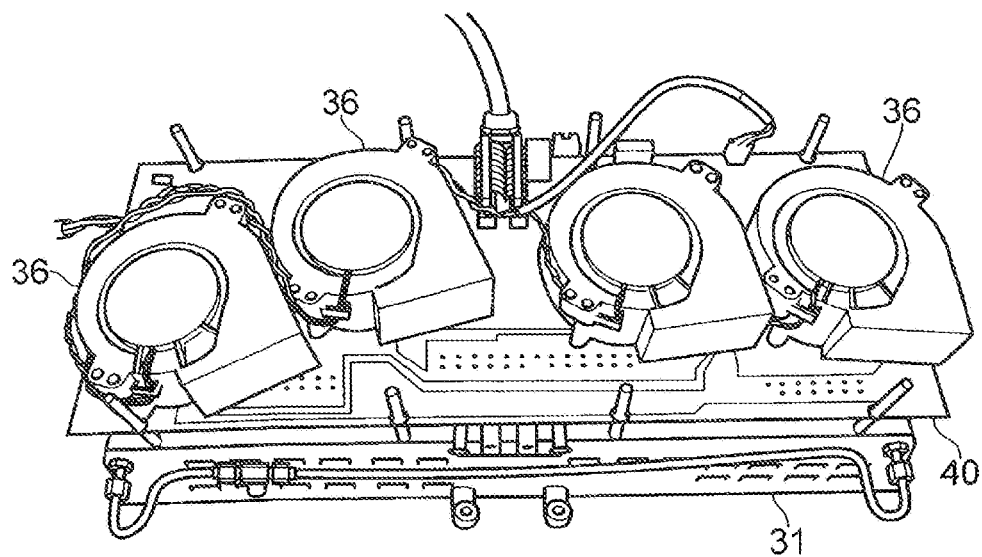
FIG. 4 is a perspective view of the top and front side of a fuel cell stack assembly showing a fuel cell stack, plenum and fan apparatus.
Figure 5:
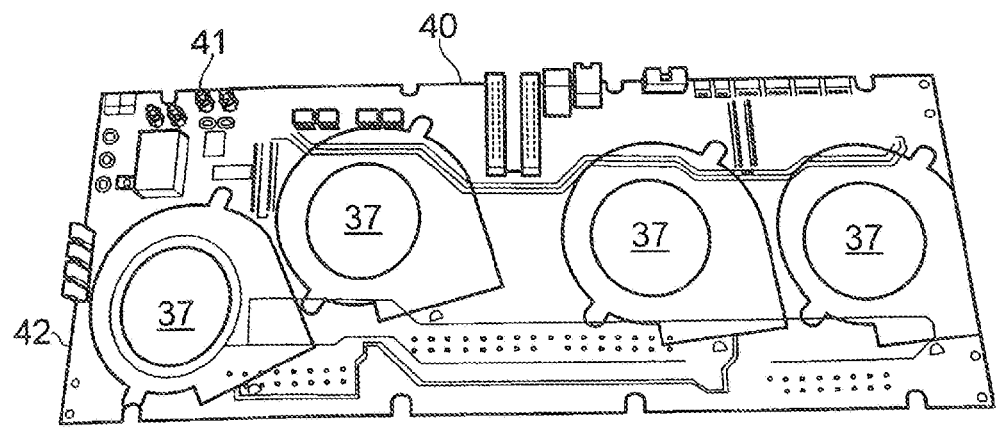
FIG. 5 is a plan view of a circuit board configured for fan and component mounting for the fuel cell stack assembly of FIG. 4.

The plenum chamber housing has, as its upper surface 38, a printed circuit board in which the apertures 37 have been formed. This is best seen in FIG. 5 which is an upper perspective view of the printed circuit board 40 without fans 36 attached. Printed circuit board 40 (PCB) comprises a plurality of electrical components 41 and circuit wiring used in the control and functional support of the fuel cell assembly. Apertures 37 are formed in the PCB 40 through which air can flow by operation of the fans mounted thereover. The installation position of four fans is shown in white outline 42 on FIG. 5. FIG. 4 shows the same perspective view of the PCB 40, this time with the fans 36 attached, and with the PCB mounted to a fuel cell stack 31. Preferably, the fans 36 are each mounted directly onto the PCB 40 with a suitable gasket providing a fluid seal around the apertures 37. A separate shroud 39 (FIG. 3) may be used to form the side walls of the plenum chamber housing. This shroud 39 could be in the form of any suitable frame or support structure for maintaining the separation of the fans 36 and the inlet/outlet face 4 of the fuel cell stack 31.

Thus, it can be seen that this arrangement exemplifies an air flow plenum chamber 33 disposed on a face 4 of a fuel cell stack 31 for delivering air to or receiving air from flow channels in the fuel cell stack, in which at least a part of the plenum chamber wall is defined by a printed circuit board 40, and where the printed circuit board 40 has at least one aperture 37 therein.

The underside of the printed circuit board 40, i.e. the part which forms an upper internal wall 38 to the plenum chamber 33, is preferably coated with a suitable potting compound or other fluid tight or fluid impermeable coating. This may be particularly adapted to ensure that air flow (which may be humidified air flow from the fuel cell stack) does not interfere with proper functioning of the electrical components 41 formed on the PCB 40. The shroud 39 or frame forming the side walls of plenum chamber housing is preferably sealed to the PCB 40 and fuel cell stack 31 using appropriate gaskets 43 or other sealing materials to ensure that dominant air flow is via the apertures 37. Ideally, the seals are completely or near completely fluid tight.

Integrating the plenum chamber 33 housing and the PCB 40 in this way offers a number of significant benefits. The otherwise unused space around the fans as seen in FIG. 6 can now be used for electronic components thus freeing up space on other faces of the fuel cell stack 62 that were taken up by circuit boards 63 and 64. Thus reduces the overall size of the fuel cell assembly and eliminates extra cabling and therefore increases power per unit volume of stack assembly. The connection of components is simplified thus reducing assembly cost. Components that are essential to monitoring air flow, cell temperature and controlling fan speed can now be connected directly onto the plenum housing. For example, temperature sensors and/or air flow sensors can be mounted directly onto the underside surface of the PCB 40 that forms the internal wall of the plenum chamber 33 and connections can be made to such devices directly through the circuit board. Heat sinks for components on the PCB can also be mounted on the PCB on the inside or outside surface where they will benefit from the forced air flow through the fuel cell for cooling. For example, power control circuits for the fuel cell stack and/or for the fans can be disposed on the PCB and the heatsinks for such power control circuits conveniently disposed on the underside of the PCB forming the internal wall of the plenum chamber. Components such as temperature sensors and heatsinks on the PCB on the inside surface of the plenum chamber can be sealed around using any suitable potting or sealing compound, while leaving functional surfaces of the component exposed where necessary using conventional PCB manufacturing techniques.

As many or as few fans 36 as necessary can be mounted onto the PCB 40, for example in order to maintain a uniform pressure distribution in the plenum chamber. This can be important with some fuel cell stacks in order to ensure that each cell is optimally cooled and exhausted, without the formation of localised hot spots or cold spots that reduce stack performance. The plenum chamber housing could comprise one or more PCBs 40 and could be integrated with the side walls or shroud 39. The PCBs 40 can be formed from any suitable robust material capable of providing structural support for electronic components, circuit traces/tracks, electrical connectors and the like.

Where radial fans are being used, each fan may be oriented about its fan axis (i.e. the vertical axis as shown in FIG. 3) at any suitable angle, for example such that all outlet point in the same direction or are somewhat convergent (as seen in FIG. 4) to make exhaust air collection easier.

Other embodiments are intentionally within the scope of the accompanying claims.

The invention claimed is:

1. A fuel cell stack assembly comprising:
a fuel cell stack;
an air flow plenum chamber having a plenum chamber wall and being disposed on a face of the stack for delivering air to or receiving air from flow channels in the fuel cell stack, at least a part of the plenum chamber wall being defined by a printed circuit board, the printed circuit board having at least one aperture therein; and a fan mounted to the printed circuit board adjacent the aperture and configured to force air through the aperture into or out of the plenum chamber.

2. The fuel cell stack assembly of claim 1 in which a face of the printed circuit board forming an internal wall of the plenum chamber is coated with a potting compound or other fluid tight coating.

3. The fuel cell stack assembly of claim 1 further including a frame coupled to the fuel cell stack forming side walls of the plenum chamber, the printed circuit board being attached to the frame and forming a fluid tight seal therewith.

4. The fuel cell stack assembly of claim 1 in which the printed circuit board includes at least one temperature sensing device mounted thereon.

5. The fuel cell stack assembly of claim 1 in which the printed circuit board includes at least one fan control circuit incorporated therein.

6. The fuel cell stack assembly of claim 1 in which the face of the stack on which the air flow plenum chamber is disposed is a face having open channel ends therein.

7. The fuel cell stack assembly of claim 3 in which the printed circuit board has a plurality of apertures therein and a corresponding plurality of fans each mounted adjacent to a corresponding aperture and configured to force air through the corresponding aperture, the fans and apertures being dispersed across the printed circuit board to provide a substantially uniform pressure distribution within the plenum chamber.

8. The fuel cell stack assembly of claim 1 in which the printed circuit board includes at least one power control circuit incorporated therein and a heatsink disposed on a face of the printed circuit board forming an internal wall of the plenum chamber.

\* \* \* \* \*